US010372354B1

(12) United States Patent
Parvathareddy et al.

(10) Patent No.: US 10,372,354 B1
(45) Date of Patent: Aug. 6, 2019

(54) HIGH RELIABILITY IN STORAGE ARRAY SYSTEMS

(71) Applicant: Nutanix, Inc., San Jose, CA (US)

(72) Inventors: Abhiram Parvathareddy, Sunnyvale, CA (US); Raghav Koteshwar Tulshibagwale, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/624,288

(22) Filed: Jun. 15, 2017

(51) Int. Cl.
*G06F 3/06* (2006.01)

(52) U.S. Cl.
CPC ............ *G06F 3/0619* (2013.01); *G06F 3/065* (2013.01); *G06F 3/0665* (2013.01); *G06F 3/0689* (2013.01)

(58) Field of Classification Search
CPC ...... G06F 3/0619; G06F 3/065; G06F 3/0665; G06F 3/0689
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 * | 12/2013 | Aron | G06F 9/45533 718/1 |
| 8,850,130 B1 | 9/2014 | Aron et al. | |
| 8,997,097 B1 | 3/2015 | Aron et al. | |
| 9,052,936 B1 | 6/2015 | Aron et al. | |
| 9,256,374 B1 | 2/2016 | Aron et al. | |
| 9,256,475 B1 | 2/2016 | Aron et al. | |
| 9,354,912 B1 | 5/2016 | Aron et al. | |
| 9,389,887 B1 | 7/2016 | Aron et al. | |
| 9,575,784 B1 | 2/2017 | Aron et al. | |
| 9,619,257 B1 | 4/2017 | Aron et al. | |
| 9,772,866 B1 | 9/2017 | Aron et al. | |

OTHER PUBLICATIONS

Poitras, Steven. "The Nutanix Bible" (Oct. 15, 2013), from http://stevenpoitras.com/the-nutanix-bible/(Publication date based on indicated capture date by Archive.org; first publication date unknown).

(Continued)

*Primary Examiner* — Eric Cardwell
(74) *Attorney, Agent, or Firm* — Vista IP Law Group, LLP

(57) ABSTRACT

A storage system for providing zero data loss during failover and failback. A storage system comprises a dual controller that includes a first controller to process a first set of storage I/O operations and a first hardware timer. Redundancy is provided by a second controller that processes a second set of storage I/O operations. The second controller has a corresponding second hardware timer. Both the first controller and second controller each employ respective dual channel drive interfaces. The dual channel drives are arranged in an array. Each controller executes instructions to access at least two different portions of any one of the plurality of dual channel drives. In a failover scenario, when a controller suspects failure of a peer, a lockless signaling protocol is invoked. After a delay for a hardware timer timeout period, the protocol signals an intention to take over resources as soon as mutual exclusion is guaranteed.

20 Claims, 10 Drawing Sheets

(56) References Cited

OTHER PUBLICATIONS

Poitras, Steven. "The Nutanix Bible" (Jan. 11, 2014), from http://stevenpoitras.com/the-nutanix-bible/(Publication date based on indicated capture date by Archive.org; first publication date unknown).
Poitras, Steven. "The Nutanix Bible" (Jun. 20, 2014), from http://stevenpoitras.com/the-nutanix-bible/(Publication late based on indicated capture date by Archive.org; first publication date unknown).
Poitras, Steven. "The Nutanix Bible" (Jan. 7, 2015), from http://stevenpoitras.com/the-nutanix-bible/(Publication date based on indicated capture date by Archive.org; first publication date unknown).
Poitras, Steven. "The Nutanix Bible" (Jun. 9, 2015), from http://stevenpoitras.com/the-nutanix-bible/(Publication late based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
NetApp Datasheet: "NetApp HCI for Service Providers", Copyright 2017, from https://www.netapp.com/us/medial/ds-3912.pdf.
Kemp, E. "NetApp HCI Data Protection" (Oct. 2017), from https://www.netapp.com/us/media/tr-4641.pdf.
Thoppay, S. "VMware End-User Computing with NetApp HCI and NVIDIA GPUs" (Jan. 2019), from https://www.netapp.com/us/media/nva-1129-design.pdf.
NetApp Datasheet: "NetApp HCI" (Dec. 2017), from https://www.netapp.com/us/media/ds-3881.pdf.
Patten, A. "NetApp HCI Theory of Operations" (Nov. 2018), from https://www.netapp.com/us/media/wp-7261.pdf.

* cited by examiner

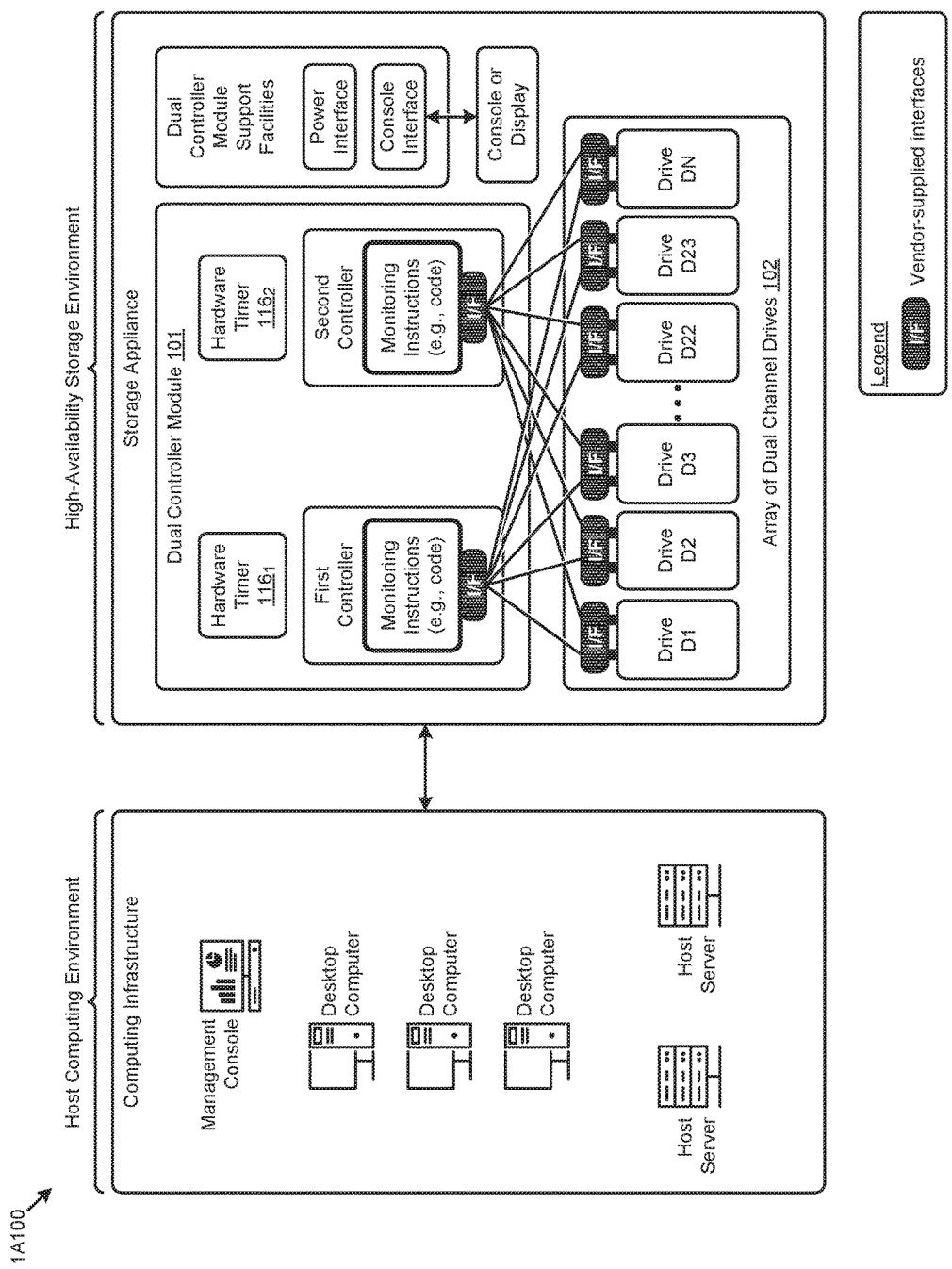
FIG. 1A1

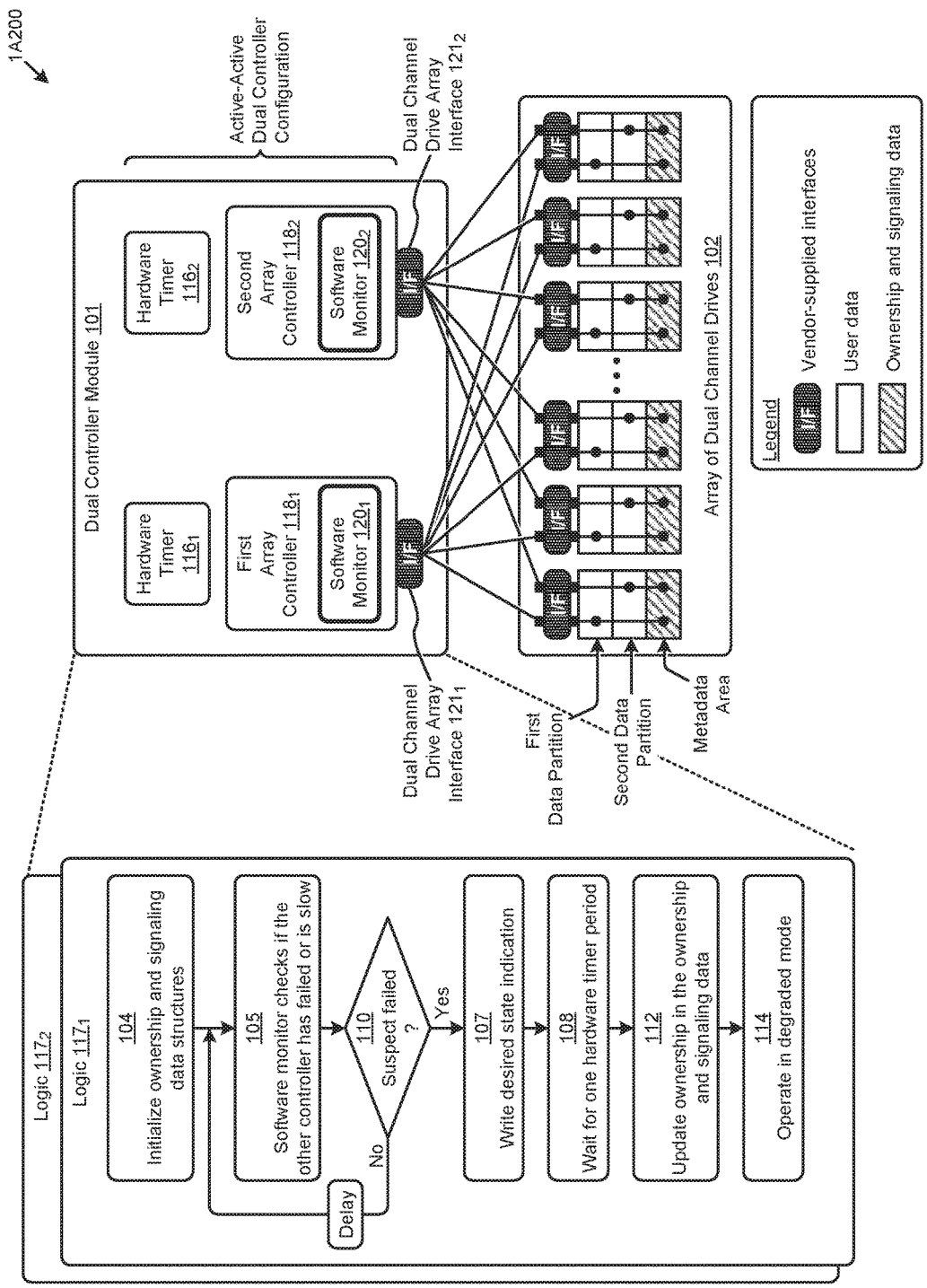
FIG. 1A2

HIGH RELIABILITY IN STORAGE ARRAY SYSTEMS

FIELD

This disclosure relates to high reliability storage array systems, and more particularly to techniques for achieving vendor independence when designing high reliability storage array systems.

BACKGROUND

Users of computing systems expect extremely high reliability from the underlying computing infrastructure, and demand zero loss of data even if there is a failure event in a component of the computing infrastructure.

Some computing system component manufacturers have approached the need for extremely high reliability by designing-in redundancy into individual components (e.g., network components, computing components, storage components, software components, etc.) of the computing system. In particular, nearly every non-volatile storage component manufacturer supplies combinations of hardware and software that are intended to address device failure detection. Manufacturers address failure detection to varying degrees. Some manufacturers design-in minimal capabilities, such as for merely reporting the occurrence and nature of a detected failure. Some manufacturers address failover and failback in various ways as well.

Unfortunately, the aforementioned manufacturers cannot predict what might be appropriate remediation (e.g., to remediate failover or to handle failback) in the event of a device failure. More specifically, manufacturers cannot predict what might be appropriate actions to take in all systems and/or in all failure conditions. For example, although some approaches involve hardware timers to assist with device locking and "cutoff" in the event of a failure (e.g., a failure of a controller), in many systems and under many circumstances, it might not be appropriate to "cutoff" or "shutoff" a component merely on the basis of a hardware timeout. Rather, various system conditions should be examined so as to determine whether or not synchronization and other operations need to be performed before a "cutoff" or "shutoff" or "cutover".

Indeed, in some cases (e.g., in some systems and/or under some conditions), a hardware-assisted "cutoff" and/or "cutover" to a standby device is the wrong action to take. As an example, it would be inappropriate to "cutover" from one device to another device if there is I/O (input/output or IO) pending for the soon-to-be "cutoff" device. Furthermore, even though most non-volatile storage device manufacturers do supply software drivers to coordinate with the supplied hardware devices, the approaches and delivered support for all of the features needed for high availability varies by vendor. In certain cases, the manufacturer-supplied driver implementation of high-availability features might buggy, or missing needed features, and/or deficient in other ways. What is needed is a way to achieve zero errors and zero downtime in a volatile storage appliance that does not rely on the presence or quality of the device manufacturer's supplied high-availability features.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for high reliability in storage array systems, which techniques advance the relevant technologies to address technological issues with legacy approaches. More specifically, the present disclosure provides a detailed description of techniques used in systems, methods, and in computer program products for implementing vendor-independent intent signaling records in a lockless protocol.

The disclosed embodiments modify and improve over legacy approaches. In particular, the herein-disclosed techniques provide technical solutions that address the technical problems attendant to achieving vendor independence in storage array system designs.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A1 depicts a high-availability configuration of a storage appliance in communication with computing infrastructure, according to an embodiment.

FIG. 1A2 presents a high-availability storage appliance having dual controllers for implementing vendor-independent ownership intent signaling records in a lockless protocol, according to an embodiment.

FIG. 2 presents a data layout used to achieve vendor independence in high-availability storage array designs, according to an embodiment.

DETAILED DESCRIPTION

Figure 1B:
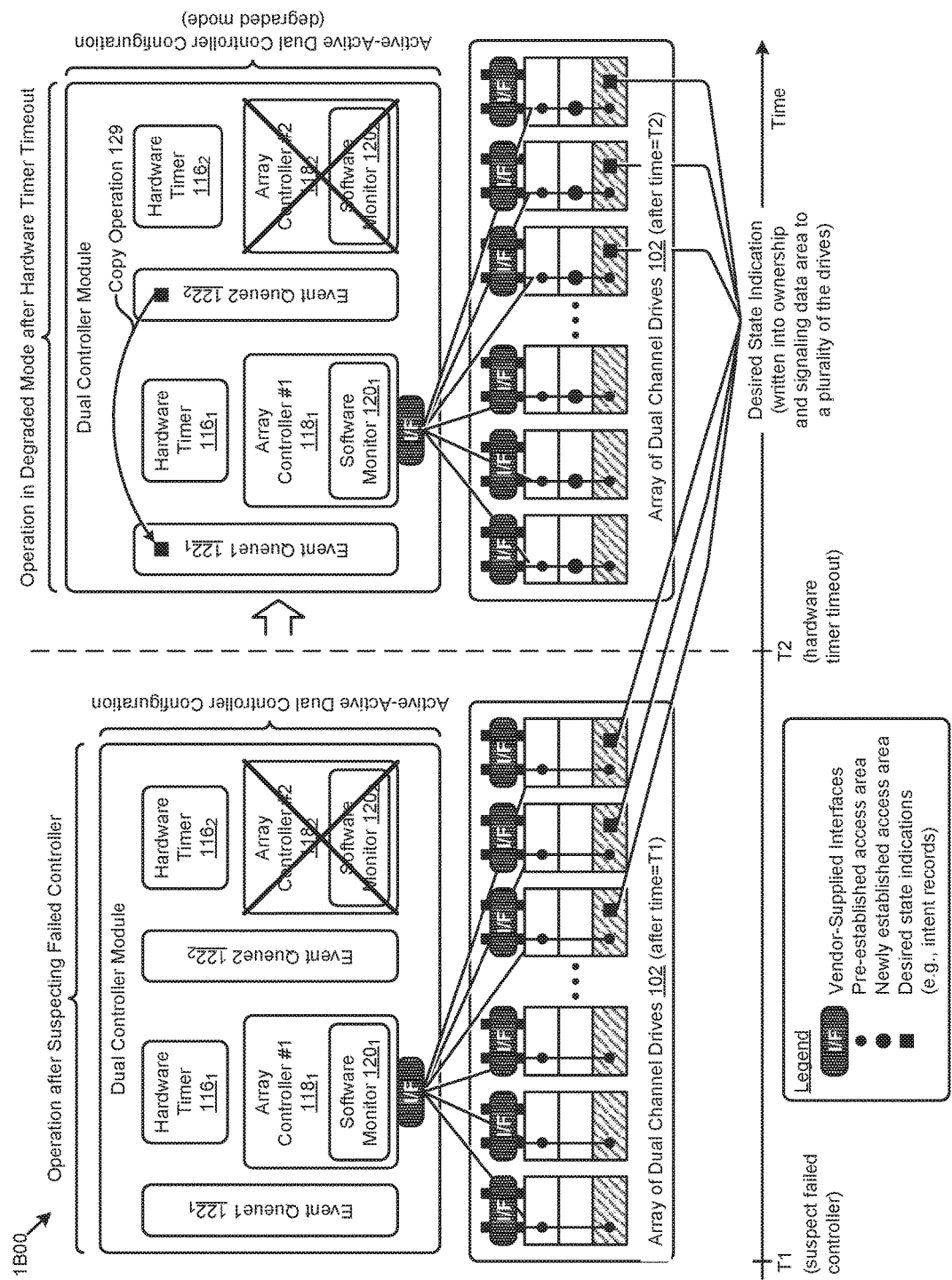
FIG. 1B shows an operational transition during a failover event through use of vendor-independent intent signaling, according to an embodiment.

Embodiments in accordance with the present disclosure address the problem of achieving vendor independence in storage array system designs. Some embodiments are directed to approaches for implementing a lockless protocol to access intent signaling records. The accompanying figures and discussions herein present example environments, systems, methods, and computer program products for implementing vendor-independent intent signaling records in a lockless protocol.

Overview

A high-reliability storage system for providing zero data loss during failover and failback is disclosed. The appliance includes a software-implemented monitoring facility that operates in conjunction with manufacturer-supplied drivers, hardware interfaces, and hardware timers. The appliance further includes a storage array composed of a plurality of dual channel drives. Each dual channel drive has a drive-side dual channel drive interface that is electrically connected to a respective controller-side dual channel drive array interface. Each controller-side dual channel drive array interface is in turn connected to a dual controller module that serves to detect events (or the absence of events) that occur in the appliance. Detection of events (or absence of such events) is accomplished by continuous monitoring within the aforementioned controllers. Failover redundancy is addressed by having at least two possible storage I/O paths between each individual controller of the dual controller module and all of the drives in the storage array.

In an example embodiment, a first controller processes a first set of storage I/O operations and a second controller processes a second set of storage I/O operations. Each individual controller monitors for events or the absence of events using the aforementioned software-implemented monitor. The software-implemented monitor is embodied in a command layer above the manufacturer's supplied drive interfaces. The software-implemented monitor of each controller includes logic that periodically resets its respective hardware timer. The software-implemented monitor maintains a data item that describes the duration of the prescribed timeframe (e.g., in seconds or a fraction thereof, in milliseconds, etc.).

The dual controller module is composed of a first controller and a second controller. Each individual controller includes a memory component that is accessible to a computing element in a respective controller. The memory component holds software instructions to access at least two different portions (e.g., mutually exclusive partitions) of any one of the plurality of dual channel drives. The software instructions further comprise instructions for lockless cross-controller signaling for initialization of mutually exclusive resource ownership by respective controllers (e.g., in a normal mode) for detection of a failure event, for carrying out a signaling protocol to release and seize of ownership by one controller (e.g., to enter into a degraded mode), and for carrying out a signaling protocol to relinquish seized ownership and then to return to a state of mutually exclusive resource ownership by each respective controller (e.g., returning to operation in normal mode).

In some embodiments, groups of the plurality of dual channel drives are assigned into redundancy groups, which redundancy groups are assigned based on a predefined degree of error detection and error correction. As discussed in detail hereunder, various metadata is stored redundantly onto the plurality of drives that form a redundancy group.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A1 depicts a high-availability configuration 1A100 of a storage appliance in communication with computing infrastructure.

The embodiment shown in FIG. 1A1 is merely one example. As shown, the high-availability configuration includes an array of dual channel drives (e.g., drive D1, drive D2, . . . , drive DN), each of which drive is in communication with both of the controllers of the dual controller module 101 using respective communication channels. The dual controller module 101 comprises a first controller and a second controller, each of which is configured to be capable of executing monitoring instructions (e.g., software code). More specifically, the monitoring instructions detect events that occur in the environment, possibly including events that pertain to the drives in their respective channels. In some cases one group of dual channel drives is provided by a first manufacturer and a second group of dual channel drives is provided by a second manufacturer. As such, there may be different embodiments of the vendor-supplied interfaces that correspond to the first manufacturer and the second manufacturer. More particularly, a first manufacturer might provide a first variant of an implementation of a standard (e.g., SCSI, SAS, etc.) and the second manufacturer might provide a second variant of an implementation of the same standard. In various embodiments, the aforementioned monitoring instructions serve to detect events that occur in the environment and respond in a manner that does not rely on any particular fault-tolerance facilities of the vendor-supplied interfaces.

Each controller can operate autonomously by executing its own respective code to monitor and/or control any of its accessible resources. As shown, each controller (e.g., the first controller and the second controller) has a respective hardware timer (e.g., hardware timer $116_1$ and hardware timer $116_2$). The monitoring instructions can set a time period in a hardware timer. The hardware timer counts through the established time period and, if the time period expires, the hardware timer can report the expiration (e.g., via a register-borne value or an interrupt event). The monitoring instructions can access a hardware timer at any time to reset the timer. In some scenarios, the monitoring instructions can determine if a previously set time period had expired (e.g., causing a timeout interrupt, or causing a reboot, or causing both a timeout event and a reboot event).

For achieving a particular degree of high availability of the array, the dual controller module 101 implements separate, independently-operable controllers. The dual controller module 101 can be implemented as a chassis (e.g., comprising one or more "boards" in a system). Each controller in the chassis can rely on respective certain dual controller module support facilities, such as the shown power facility and the shown console interface facility, where each controller has its own support facility. Given the two (or more) separate, independently-operable controllers, and given that each controller has its own dedicated memory, each of the two or more controllers are independently-operable so as to eliminate occurrence of a "single point of failure" at the controller level. The shown storage appliance itself might include one or another form of a console, and/or the storage appliance itself might merely implement a console interface that can be accessed by a management console. In some cases, a console interface or console or portions thereof might be provided by the same vendor that provides the shown vendor-supplied interfaces.

In some cases, a console interface implements a web service that can be invoked by a management console, which in turn can be implemented by a desktop computer and/or host servers or any other computing infrastructure that can access the storage appliance.

Figure 2:
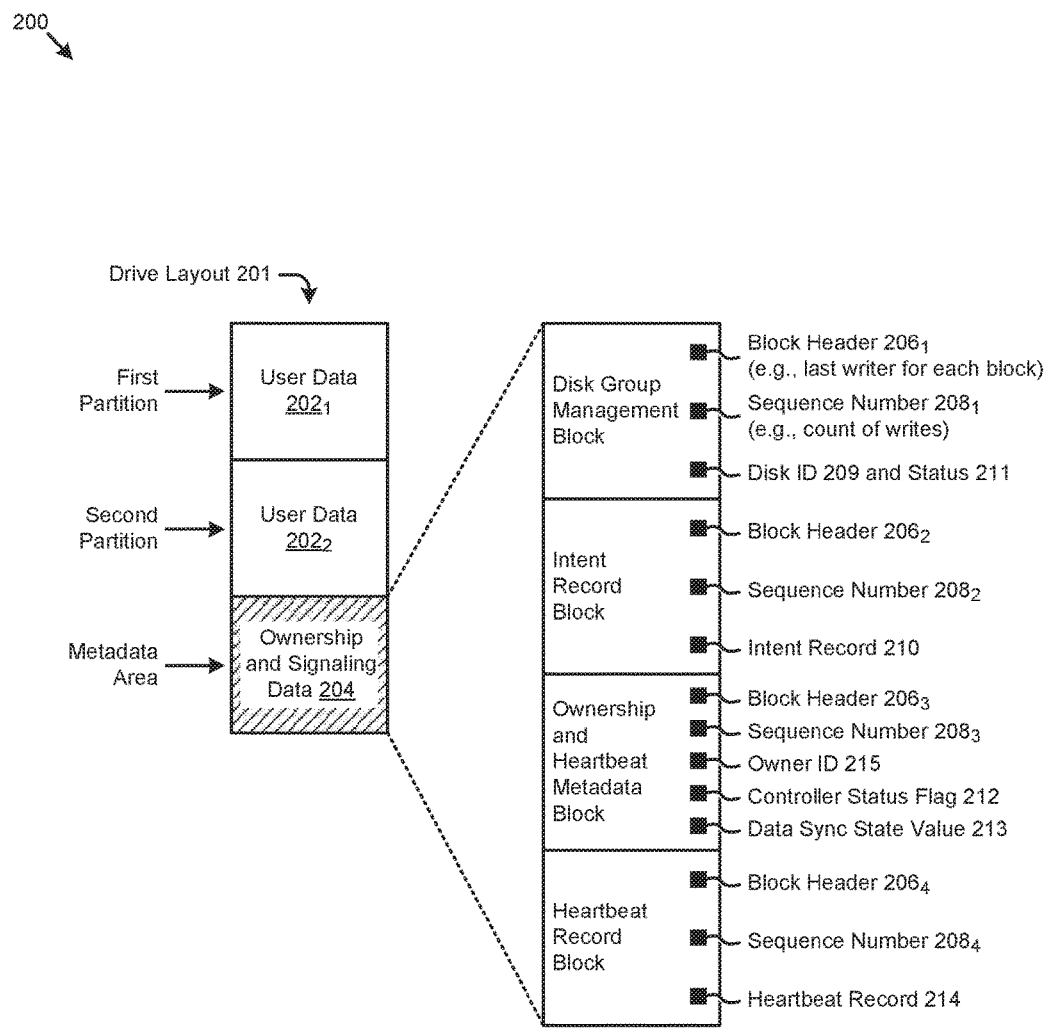

FIG. 1A2 presents a high-availability storage appliance 1A200 having dual controllers for implementing vendor-independent ownership intent signaling records in a lockless protocol. As an option, one or more variations of high-availability storage appliance 1A200 or any aspect thereof may be implemented in the context of the architecture and functionality of the embodiments described herein. The high-availability storage appliance 1A200 or any aspect thereof may be implemented in any environment.

The specific embodiment shown in FIG. 1A2 includes two controllers (e.g., a first array controller $118_1$ and a second array controller $118_2$), both of which operate concurrently to implement an active-active dual controller configuration. Each controller in the active-active dual controller configuration has a dual channel drive array interface (e.g., dual channel drive interface $121_1$ dual channel drive interface $121_2$, respectively) and each controller in the active-active dual controller configuration has access to a respective hardware timer. Furthermore, each controller implements a respective software monitor (e.g., software monitor $120_1$, software monitor $120_1$), which in turn is configured to access its respective hardware timer to implement the logic shown on the left side of FIG. 1A2. More specifically, the first array controller $118_1$ carries out its own logic $117_1$ and the other array controller $118_2$ carries out its own logic $117_2$.

The logic includes step 104 to initialize ownership and signaling data structures. Such initialization of ownership and signaling data structures is implemented in various storage areas of the array of dual channel drives 102. More specifically, each dual channel drive is partitioned into a first user data partition and a second user data partition. In the exemplified embodiments, the aforementioned two partitions are non-overlapping. In an initial configuration, a first channel of a drive can be assigned to handle user I/O (input/output or IO) destined for the first partition, and a second channel of a drive can be dedicated to handle user I/O destined for the second partition. As such, each of the two array controllers of the active-active dual controller configuration perform simultaneous active-active IOs that are destined to a respective assigned partition. The active-active mode is the "normal" mode in which mode the array controllers handle I/O independently from the other controller. In some scenarios (e.g., in the aforementioned degraded mode), one controller can access both of the two non-overlapping partitions.

In the active-active mode, each array controller monitors the "liveness" of the other controller. In the implementation shown, a software monitor (e.g., software monitor $120_1$, and software monitor $120_2$) of a respective array controller implements autonomous monitoring logic (e.g., logic $117_1$, and logic $117_2$). As earlier indicated, each array controller encounters step 104 to initialize ownership and signaling data structures. One controller might reach the instructions of step 104 before the other controller, accordingly the sub-logic of step 104 performs tests to determine if the first partition and/or the second partition have already been generated for a particular drive.

In another implementation of step 104, a first controller is assigned the task of initializing a first group of drives, and a second controller is assigned the task of initializing a second group of drives. Portions of the ownership and signaling can be implemented as data structures and data values written into a metadata area that is allocated and initialized on each drive. The metadata is used for signaling of intent and for voting when determining consensus during failover and failback scenarios.

In an initial, "normal" mode, both array controllers initially assume that the other array controller is performing in the "normal" mode; however, in a loop, each array controller performs checks on the other. Specifically, a software monitor perform checks 105 to see if the other controller has failed or is operating more slowly than expected. Periodically, the checks 105 are considered via tests performed at or before decision 110 to form a hypothesis that the other controller (e.g., array controller $118_2$) is suspected of having failed. Upon formation of a failure hypothesis, logic progresses to step 107 to indicate that this controller (e.g., array controller $118_1$) intends to take over the responsibilities (via the 'Yes' path of decision 110) of the suspected failed array controller; otherwise, if the other controller is not suspected as having failed, the array controller loops back after a delay (via the 'No' path of decision 110) to again perform checks 105.

At step 107, based on an occurrence of a failure hypothesis, further steps are taken to indicate the detecting controller's intention to take over, and to be certain that the other array controller had failed indeed. A degree of certainty can be obtained when, after waiting a full hardware timer cycle (at step 108), the suspected failed array controller had indeed failed to reset its hardware timer and thus can be deemed to have failed. In such a case, step 112 serves to write signaling data to the metadata area of at least a subset of all drives. Such signaling can be accomplished by using the assigned channel of the dual channel drives. When the signaling data has been written, the system begins to operate in a degraded mode (at step 114) whereby all I/O arriving at the dual controller module 101 is processed by the seizing array controller.

Steps for transitioning from a dual active-active "normal" mode to a single-controller "degraded" mode include steps for writing intent records and steps for seizing responsibility for handling the I/O pertaining to both the first partition and the second partition. Such steps are described as pertains to the following FIG. 1B.

FIG. 1B shows an operational transition 1B00 during a failover event through use of vendor-independent intent signaling. As an option, one or more variations of operational transition 1B00 or any aspect thereof may be implemented in the context of the architecture and functionality of the embodiments described herein. The operational transition 1B00 or any aspect thereof may be implemented in any environment.

The operational transition shown in FIG. 1B depicts a sample failure scenario whereby the first array controller suspects failure of the second controller at time=T1. At that moment in time, a set of desired state indications are written (e.g., as per step 107 of FIG. 1A2). The desired state indications are written to a plurality of drives, where the number of drives is derived from a failure/recovery requirement. For example, if the system is to be able to detect and recover from a two drive failure, then the desired state indications are written to five drives so that a consensus (e.g., using the three surviving drives) can be reached even when there are indeed two concurrently failed drives. As another example, if the system is to be able to detect and recover from a three drive failure, then the desired state indications are written a group of drives so that a consensus can be reached even when there are indeed three concurrently failed drives. The number of drives to which the desired state indications are written can be determined from a fault tolerance factor that specifies (e.g., in a service level agreement or codification thereof) conditions under which the system is to perform without data loss, even given the event or events of one or more drive failures.

In the situation where the array of dual channel drives has a number N of drives, then the first controller might be assigned to read/write metadata to/from the first (e.g., lower numbered) M drives (M<N), and the second controller might be assigned to read/write metadata of the last (e.g., higher numbered) M drives.

Returning to the discussion of the progression through time as depicted in FIG. 1B, upon a determination that the second controller had indeed failed at time=T2 (after the waiting period of step 108 of FIG. 1A2), the first controller begins to take over I/O that had been originally routed to the second array controller. More specifically, the first controller uses its assigned channel to access the drives of the array. Prior to the operational transition, the second array controller had been using its assigned channel to perform I/O to the second partition. After the takeover event at time=T2, the first array controller takes on that responsibility. As shown, after time=T2, in addition to the I/Os originally routed to its pre-established access areas (e.g., to perform access I/Os that are destined to the first partition of each drive), the first array controller also takes on responsibility for performing I/Os to a newly established access area (e.g., to perform access I/Os that are destined for the second partition).

The timing of the event at time=T2 cannot be precisely known a priori, accordingly, the implementation of the shown dual controller module includes event queues (e.g., event queue $122_1$ and event queue $122_2$) to hold pending I/Os (e.g., READs and WRITEs) and their status (e.g., PENDING, OK, ERROR, etc.). Implementation of such event queues can be via software or hardware or a combination of hardware and software. When an array controller that intends to take over for a suspected failed array controller deems that the suspected failed array controller has indeed failed, the surviving array controller can access the event queue of the failed array controller to retrieve I/Os that either have not yet been sent over the vendor-supplied interfaces, or that have not yet completed successfully. Inasmuch as those I/Os have not and will not be performed by the failed controller, the surviving array controller will eventually perform those I/Os. In one scenario, the fact that the I/O operations that were not performed by the failed controller can be detected by the originally-issuing process, and then reissued by that process for eventual performance by the controller that did not fail. Inasmuch as the controllers do not share memory, the shown copy operation 129 depicts movement of I/Os from the failed controller's event queue to the surviving controller's event queue using network I/O.

In some embodiments, particular ones (e.g., adjacent ones) of the dual channel drives are assigned into redundancy groups for storing metadata, which redundancy groups are assigned based on a predefined degree of error detection and error correction. For example, for a drive failure/error correction requirement of "one" (e.g., a single drive failure can be detected and corrected), a redundancy group of three drives can be assigned to hold the same metadata in a redundant fashion (e.g., in corresponding metadata partitions). In another example, for a drive failure/error correction requirement of "two" (e.g., two contemporaneous drive failures can be detected and corrected), a redundancy group of five drives would be assigned to hold the same metadata in a redundant fashion. Disk groups, specifically formation of disk redundancy groups are further shown and discussed as pertains to FIG. 5.

FIG. 2 presents a data layout 200 used to achieve vendor independence in high-availability storage array designs. As an option, one or more variations of data layout 200 or any aspect thereof may be implemented in the context of the architecture and functionality of the embodiments described herein. The data layout 200 or any aspect thereof may be implemented in any environment.

The shown drive layout 201 is merely one example. The example shows a drive as being partitioned onto a first partition to accumulate and hold user data $202_1$ and a second partition to accumulate and hold user data $202_2$. Additionally, the shown drive layout 201 includes a metadata area that comprises ownership and signaling data 204. The ownership and signaling data 204 is in turn composed of four areas, namely (area 1) a disk group management block, (area 2) an intent record block, (area 3) an ownership and heartbeat metadata block, and (area 4) a heartbeat record block.

The blocks themselves might be blocks that correspond to an I/O sector size of the drive. For example, a spinning media drive might be composed of a collection of blocks that are 512 bytes each, whereas a flash drive might be composed of a collection of 4 k blocks that are 4096 bytes each. Strictly for illustration pertaining to blocks/sectors, the block/sectors of a drive are the size of a low-level read operation or write operation. Such read or write operations to/from a block/sector are atomic.

The aforementioned four areas are each defined to hold data in a manner that can be read and written by multiple readers/writers. The aforementioned atomicity is observed for all read/write I/O operations, including in the presence of multiple readers/writers.

Each one of the aforementioned four areas comprise respective block headers (e.g., block header $206_1$, block header $206_2$, block header $206_3$, block header $206_4$) that hold information pertaining to, for example, an identification of the last writer for the block (e.g., was it written by a first controller or a second controller, etc.). In some cases, a checksum and/or "magic number" and/or other identification value (or any combination thereof) is used to identify the last writer for the block.

Also, each one of the aforementioned four areas comprise respective sequence numbers (e.g., sequence number $208_1$, sequence number $208_2$, sequence number $208_3$, sequence number $208_4$) that holds information pertaining to, for example, a value that captures a monotonically increasing transaction sequence indication. Sequence numbers can be used in majority voting or other consensus processing over a redundancy group.

The disk management group block stores disk information such as a disk ID 209 and status 211 that captures the last writer's identity and its status. The intent record block captures an intent record 210 that is used to implement lockless transitions from a normal mode to a degraded mode (e.g., to accomplish a failover transition) and back again to a normal mode (e.g., to accomplish a failback transition).

Other data written into the respective four areas are specific to their purpose in implementing lockless cross-controller signaling. More specifically, the ownership and heartbeat metadata block comprises data that indicates ownership via an ownership ID 215. The ownership ID 215 and intent record 210 are used extensively to facilitate transition without use of locks. The ownership and heartbeat metadata block further comprises controller status information (e.g., a controller status flag 212) as well as data synchronization information (e.g., in the form of a data synch state value 213).

The heartbeat record block holds the aforementioned block header, the sequence number of the last write, and a heartbeat record 214. The heartbeat record might be composed of just one bit (e.g., 1 or 0) or just one byte (e.g., 1 or 0), or might be composed of other indications such as a timestamp.

The shown drive layout 201 is merely one embodiment. Other drive layouts and data layouts are possible, which layouts might be defined based on the nature of the drive that holds the data and/or which layouts might be defined based on the nature of the controllers that read and write the data. More specifically, the drive layout and/or the data layout might be defined in any manner that facilitates vendor-independent intent signaling. One example of vendor-independent intent signaling is shown and described as pertains to the following FIG. 2.

Figure 3:
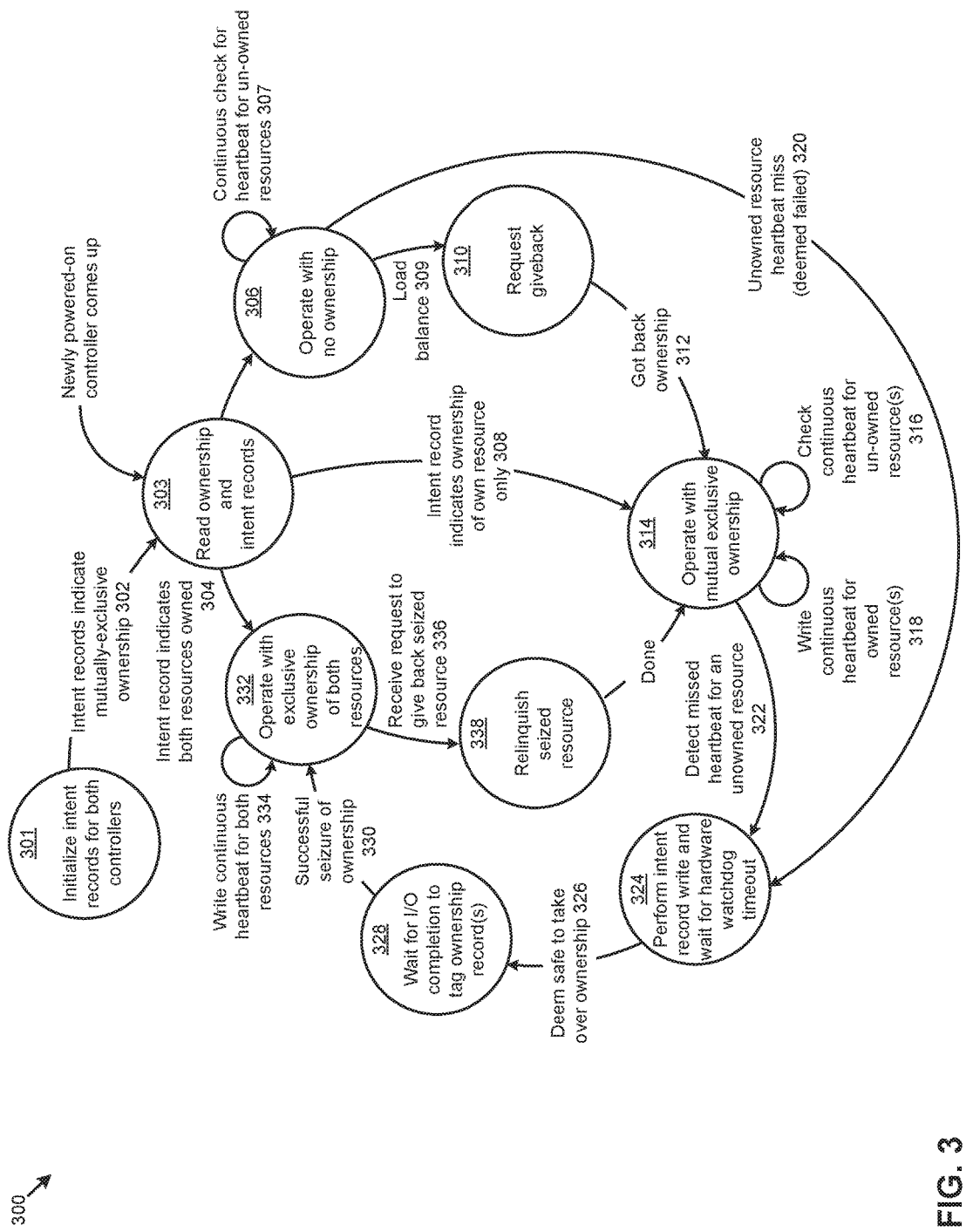
FIG. 3 presents a state diagram showing one implementation of vendor-independent intent signaling, according to an embodiment.

FIG. 3 presents a state diagram 300 showing one implementation of vendor-independent intent signaling. As an option, one or more variations of state diagram 300 or any aspect thereof may be implemented in the context of the architecture and functionality of the embodiments described herein. The state diagram 300 or any aspect thereof may be implemented in any environment.

The embodiment shown in FIG. 3 depicts a selected set of states and transitions as implemented by software instructions that are carried out by the controllers for signaling intent. A set of software instructions executed by each of the controllers are resident in a memory component of the respective controller. One time, at some moment (e.g., during configuration of an array system), the intent records are initialized. Thus, upon initial power-on of the controllers, the controllers assume the intent records have been initialized or that the intent records are in a known state from prior processing, which known state can be determined by reading the intent records and other metadata. When the intent records indicating mutually-exclusive ownership are written to the metadata area, the controllers read ownership records and the just-written intent records (in state 303). The first time this state is entered by each controller, the read intent records are the records that had just been written to cause egress from state 301 through transition 302. Accordingly, state 314 is entered after determining (at transition 308) that the intent records indicate ownership of its own resources only. More specifically, after a power-up event or other boot-up event, each controller reads ownership and intent records (in state 303). Then, based on the values of the read ownership and intent records, each controller enters a primary mode or a standby mode for its assigned resource or resources.

The shown state 314 is indicative of the "normal" state, where each controller performs storage I/O operations over only its own resources. In the "normal" state, each controller periodically writes heartbeat data (at operation 318) into the heartbeat record block, which heartbeat data pertains to that controllers' owned resources. Also, periodically, each controller checks (at operation 316) for heartbeat data pertaining to unowned resources.

Ongoing operations in this state may continue indefinitely if there are no missed heartbeats, however it can happen that, for any number of reasons, a heartbeat record is not updated within the heartbeat time period. When such a missed heartbeat is detected (at transition 322), the controller that detected the missed heartbeat of another controller enters state 324, at which time the detecting controller performs an intent record write followed by a wait for a hardware watchdog timeout period. When the hardware watchdog timeout period expires, then the occurrence of the expiration of the time period is interpreted to mean that the other controller is actually "dead" and that it is safe for the surviving controller to take over ownership (at transition 326) of the dead controller's resources, which is accomplished by writing new ownership records and/or any other indication or indications or tags pertaining to the taken-over resources. As an illustration of being actually "dead", a controller that cannot reset its hardware timer within the prescribed time period will suffer a reboot as a consequence of the hardware timer timeout. In that sense the controller is/was "dead", since the controller had been forcefully rebooted.

State 328 waits for the completion of the I/O pertaining to the take-over of resources. Specifically, upon recognition of the completion of the I/O pertaining to the taken-over resources, the surviving controller then considers that it now owns the resources of the dead controller. Transition 330 is taken into state 332 whereby the surviving, seizing controller operates with exclusive ownership of both sets of resources, namely the surviving controller's owned resources as well as what were formerly the now deemed dead controller's resources. In this state 332, the surviving controller continuously writes heartbeat records (at operation 334) for both sets of resources.

At some point the conditions that caused the "dead" controller to be deemed as dead may be remedied, and/or may be replaced with an operational controller. Upon such an occurrence, the back-to-life controller may write an intent record that indicates a request for the surviving controller to give back (at transition 336) the seized resources. The surviving controller enters a state 338 within which state the surviving controller writes an intent record that indicates intent to relinquish ownership of the formerly seized resources. Once the request to relinquish is granted, state 314 is entered again, whereby the controllers both operate in "normal" mode with mutually-exclusive ownership.

State 303 might be entered any time a newly-deployed or remediated controller is brought to an operational state. In the foregoing description, on a system power-on, the ownership records might indicate mutually-exclusive ownership, and thus proceed to state 314. However it is possible that a newly-deployed or remediated controller is brought to an operational state when the intent records indicate that all resources are owned by another controller. In this situation, the newly-deployed or remediated controller enters state 303, then traverses transition 304 to enter state 332 for a time—at least until the newly-deployed or remediated controller indicates a request that the owning controller give back ownership of the resources that would be returned to the newly-deployed or remediated controller.

It is possible that upon an entry to state 303 the ownership records indicate that none of the resources are owned. In such a case, a transition is taken into state 306, where, for a short time, the entering controller operates with no ownership. After a check (at operation 307) for a heartbeat pertaining to unowned resources, a load balancing operation is performed, thus traversing through transition 309 into state 310, within which state the transitioning controller requests that the then-owning controller give back ownership. Upon confirmation that the intent records indicate that the ownership has indeed been returned (at transition 312), the controller that just received returned ownership enters state 314, which is the "normal" state.

It is possible that, during the timeframe that a controller is in state 306, that a heartbeat pertaining to unowned resources is missed, thus indicating that the load cannot be balanced to move through transition 309 into state 310 and, instead, the surviving controller traverses through transition 320 into state 324, whereby the surviving controller pursues takeover of the resources pertaining to the missed heartbeat. Strictly as one example, consider a situation with two resource sets, and more specifically the scenario that arises when a first controller owns both resource sets and the second controller has just come up to liveness. In such a scenario, at that moment in time, the second controller does not own any resources. Now consider the unfortunate but possible event that the first controller dies for whatever reason. Thenceforth, the second controller will begin seeing missed heartbeats for both resource sets. Thus, in accordance with the herein-described logic, the second controller will seize ownership of both resource sets and the system will state transition into a degraded mode with the second controller having ownership of both resource sets.

Each controller implements instructions to move from state 314 to state 332 (e.g., to effect a "failover. Also, each controller implements instructions to move from state 332 to state 314 (e.g., to effect a "failback").

Figure 4A:
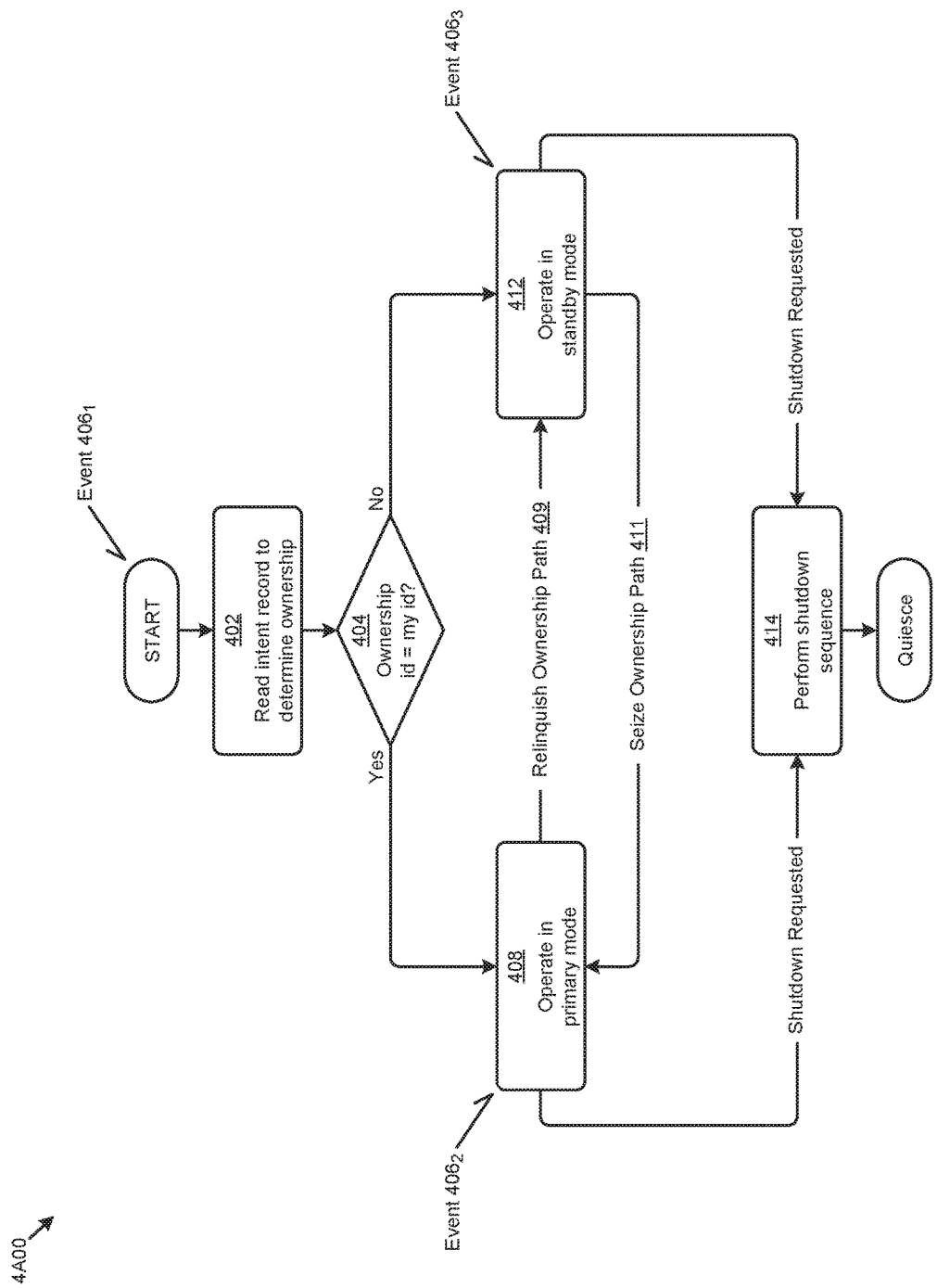
FIG. 4A is a diagram showing state transition flows between a primary mode and a standby mode, according to an embodiment.

FIG. 4A is a diagram showing state transition flows 4A00 between a primary mode and a standby mode. As an option, one or more variations of state transition flows 4A00 or any aspect thereof may be implemented in the context of the architecture and functionality of the embodiments described herein. The state transition flows 4A00 or any aspect thereof may be implemented in any environment.

The shown flow commences upon an event $406_1$. As one example, the event $406_1$ might be a power-on event. Upon such an event, the ownership and signaling data is read (at step 402) by a particular controller. The owner ID present in the ownership and heartbeat metadata block is read and compared (at decision 404) against the ID of the particular controller. If the ownership as indicated in the ownership and signaling data 204 indicates that the owner ID is the same as the ID of the reading controller, then processing proceeds to primary mode 408, which enters a routine comprising a set of instructions that serve to operate in a primary mode until such time as an event such as event $406_2$ causes a transition to operation in a standby mode (e.g., via the relinquish ownership path 409).

Both (or any number of) controllers can respond to event $406_1$ so as to execute the steps of FIG. 4A. As such, when a second or Nth controller traverses the 'Yes' branch of decision 404, the plurality of controllers each enter into their respective instructions to operate in primary mode. Operation in primary mode 408 may continue indefinitely; however, it can happen that for any number of reasons, event $406_2$ might occur (e.g., occurrence of the other controller's request for return of a resource), in which case a detecting controller will traverse via path 409 to relinquish ownership of its resources. The detecting controller commences to operate in a standby mode 412, until such time that an event $406_3$ is detected, after which processing traverses move via path 411 to seize resources. In certain cases, the event $406_2$ or event $406_3$ might correspond to a request to the controller to perform a shutdown sequence. When a shutdown is requested, the honoring controller enters step 414 to perform a shutdown sequence. Upon completion of the shutdown steps, the controller quiesces.

Figure 4B:
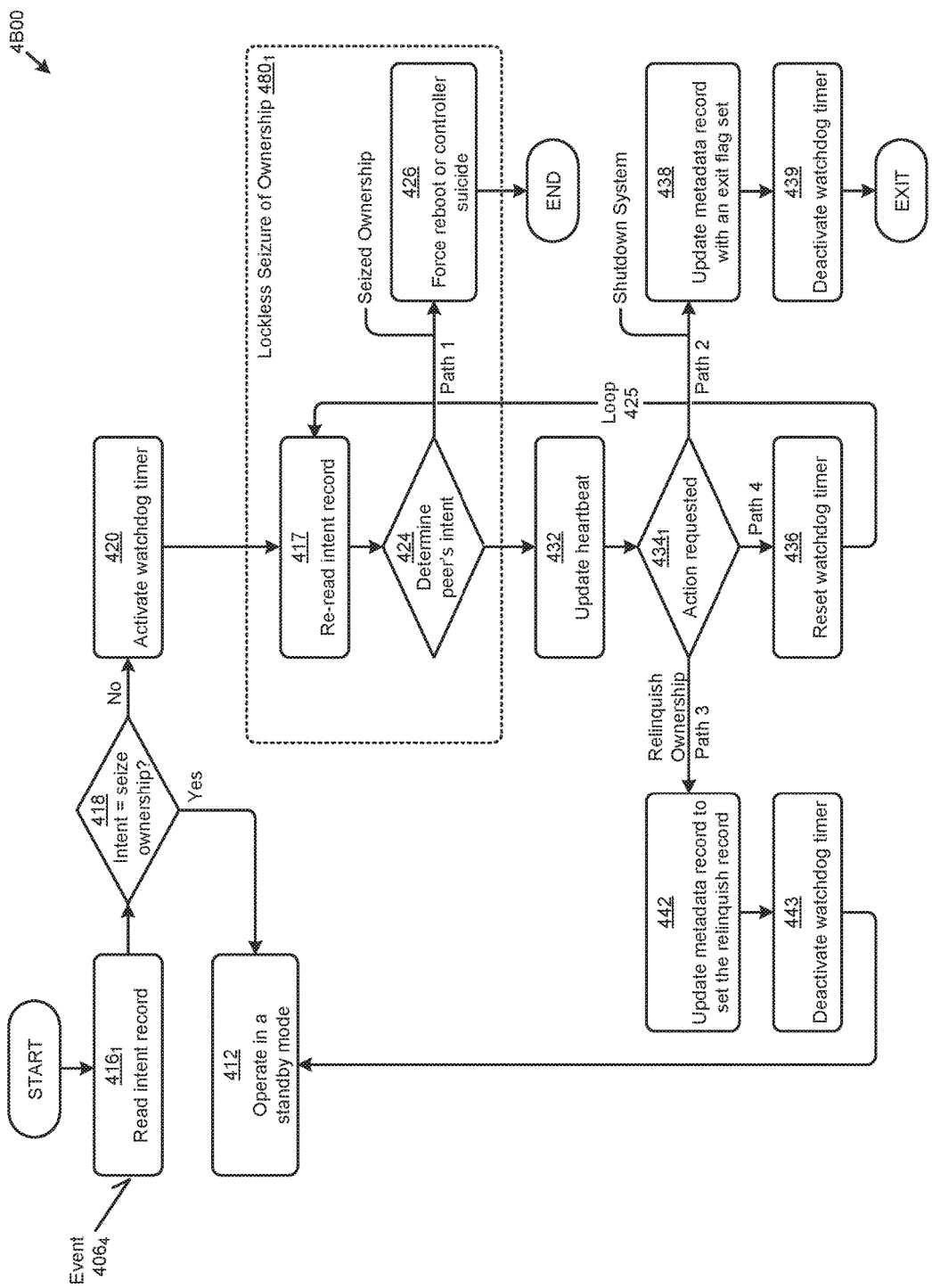
FIG. 4B is a flowchart depicting operation in a primary mode as carried out by a vendor-independent component of a high-availability storage array, according to an embodiment.

A detailed discussion of operation in primary mode is shown and described in FIG. 4B. A detailed discussion of operation in standby mode is shown and described in FIG. 4C.

FIG. 4B is a flowchart 4B00 depicting operation in a primary mode as carried out by a vendor-independent component of a high-availability storage array. As an option, one or more variations of primary mode processing or any aspect thereof may be implemented in the context of the architecture and functionality of the embodiments described herein. The primary mode processing or any aspect thereof may be implemented in any environment.

As depicted, and strictly as one example of a processing sequence, processing commences upon event $406_4$. As an example of processing after event $406_4$ would be when the controller then reads the ownership information from the ownership and heartbeat metadata block determines that it is the owner of a resource. In another scenario, event $406_4$ might be raised based on the detection of a missed heartbeat from a peer controller. Detection of an event $406_4$ (from any origination) causes the intent record to be read (at step $416_1$). If the just read intent record indicates a controller intention to seize ownership (e.g., by the peer controller), then the "Yes" branch of decision 418 is taken and the system operates in standby mode (at step 412). Otherwise, if the just read intention record does not indicate a controller's intention to seize ownership (at decision 418) then the "No" path of decision 418 is taken and, as such, the executing controller activates its watchdog timer (at step 420) and initiates a protocol (e.g., the shown protocol for lockless seizure of ownership $480_1$) to determine if (1) the other side wants to take over a resource that the executing controller owns, or to determine (2) if the other controller has signaled a request for the executing controller to relinquish resources. More specifically, during processing of the aforementioned protocol, the executing controller re-reads the intent record (at step 417) and checks the metadata (at decision 424) to determine the peer controller's intent.

There are two possible outcomes of such an event. One possibility follows path 1, which corresponds to the situation where a controller checks the metadata at decision 424 at a time when a peer controller had already taken over ownership responsibilities. In such a case, the deemed failed controller will either shut itself down (e.g., and await remediation) or will reboot itself (at step 426) in the expectation that it will come up refreshed, signaling an intention to take back responsibilities for its originally-assigned resources and then take back resource ownership.

Another possible outcome follows the shown path to step 432. This path corresponds to the case where there is no intention indicated by the peer controller. In such a case the executing controller enters a loop 425 to update its own heartbeat (at step 432), then to check (at decision $434_1$) for conditions that would cause either a shutdown to be initiated (e.g., via path 2), or conditions (at decision $434_1$) that would cause the executing controller to take path 3 to relinquish ownership of its resources by updating metadata to indicate that the ownership has been relinquished (at step 442). When path 3 is taken and ownership has been relinquished, the watchdog timer is deactivated (at step 443) and the system proceeds to operate in a standby mode (at step 412).

Alternatively, when proceeding down path 4, the executing controller continues to operate in a loop (e.g., the aforementioned loop 425) until such time as an event occurs to signal that the peer controller is ready to resume responsibility for its resources and operate in primary mode. During each pass through loop 425, the executing controller resets is watchdog timer (at step 436).

In another case the processing path is based on a determination that a shutdown action had been requested (e.g., at decision $434_1$). This case proceeds onto path 2. More specifically, it can happen that the executing controller's check (at decision $434_1$) determines that a shutdown had been requested by an administrative action. In such a case, the path 2 branch of decision $434_1$ is taken, and the executing controller commences with its shutdown and exit procedure. As shown, a metadata flag is set (at step 438) to indicate commencement of a shutdown procedure. The watchdog timer is deactivated (at step 439) before shutdown.

Figure 4C:
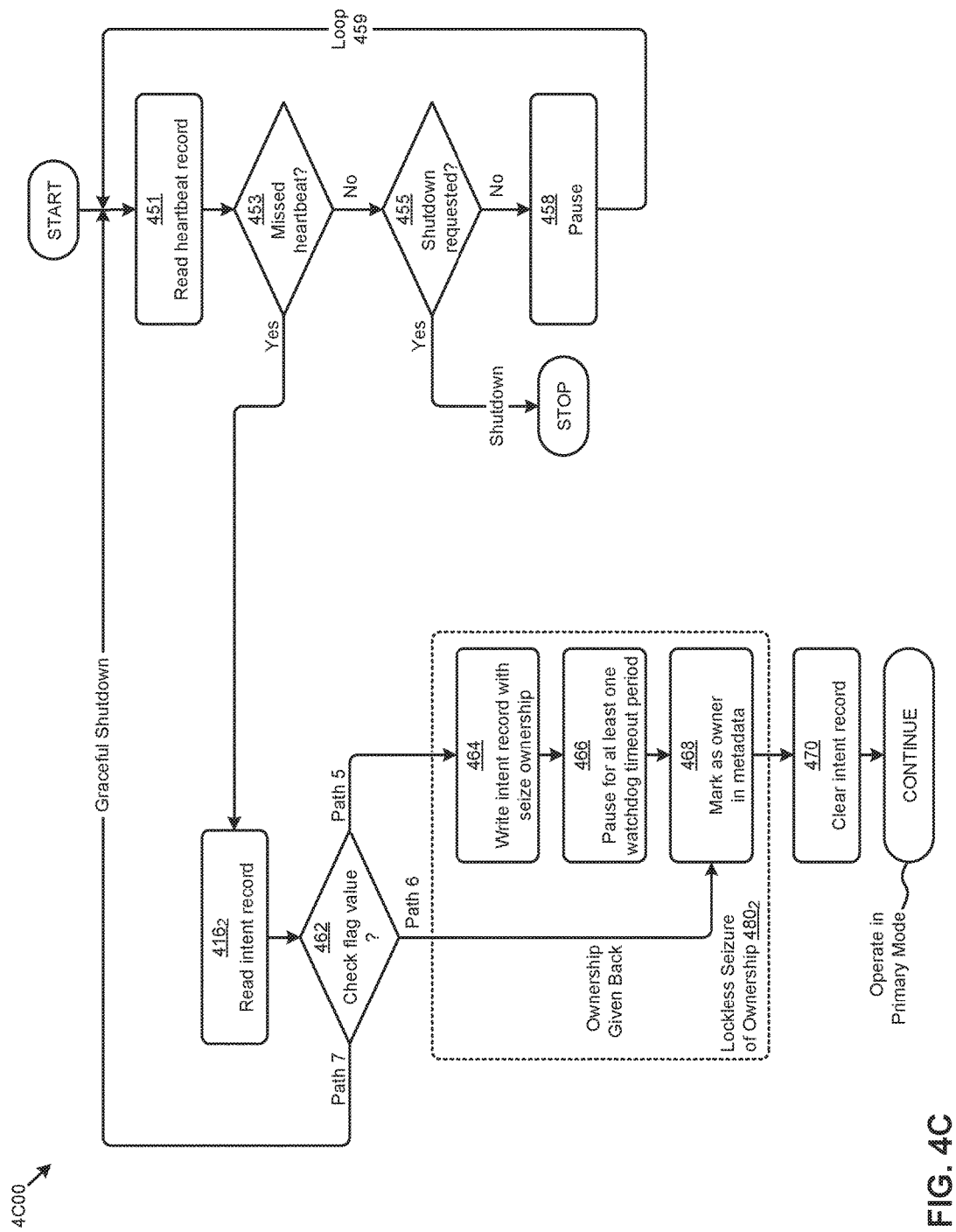
FIG. 4C is a flowchart depicting operation in a standby mode as carried out by a vendor-independent component of a high-availability storage array, according to an embodiment.

FIG. 4C is a flowchart depicting operation in a standby mode as carried out by a vendor-independent component of a high-availability storage array. As an option, one or more variations of standby mode processing 4C00 or any aspect thereof may be implemented in the context of the architecture and functionality of the embodiments described herein. The standby mode processing 4C00 or any aspect thereof may be implemented in any environment.

In this standby mode, any of the peer controllers can process logic beginning from the shown START and then proceed to read the heartbeat record (at step 451). If logic deems that there is a missed heartbeat (at decision 453), then processing proceeds to step $416_2$ (see farther below). However, if the logic of decision 453 deems that a heartbeat was not missed, then processing proceeds onward through the loop 459, pausing (at step 458) for a duration of the heartbeat period. It can happen in any iteration of the loop 459 that a request for orderly shutdown had been requested, which request is detected at step 455. In that case, the shutdown request is honored and the executing controller is moved to a stopped state.

After START, and after the heartbeat record has been read (at step 451), and if logic deems that there has been a missed heartbeat (YES path of decision 453), then processing proceeds to step $416_2$. The value of the intent record in combination with then-present conditions are such that, at decision 462, there are multiple processing paths that can be taken. As shown, a path 5 is taken when conditions are such that the executing controller is ready to seize responsibility for the resources of the peer controller. Specifically, the executing controller writes an intent record (at step 464) to signal to the peer controller that the seize request is being honored. The executing controller then waits (at step 466) for at least one watchdog timeout period to make certain that the peer controller is "dead", then the executing controller marks itself (at step 468) as the owner of the seized resources. The protocol for lockless seizure of ownership $480_2$ has thus been carried out. Accordingly, the executing controller clears the intent record (at step 470) and continues ongoing operation in its primary mode.

In another scenario, upon a determination at decision 462, it is possible that the resources that had been earlier seized had been given back. In this case, path 6 is taken and the executing controller marks itself as the owner of its assigned resources by writing ownership records into the metadata areas of enough drives to be able to determine a consensus even in the case of one or more drive failures.

In a third scenario, and specifically referring to the checks being performed at or before decision 462, it is possible that a deemed failed controller receives a shutdown signal, possibly as a result of an administrative action. In such a case, path 7 of decision 462 is taken, and the executing controller proceeds to carry out a protocol for an orderly shutdown. The shutdown protocol proceeds on the basis of an awareness of at least some of the operations of a peer node. Specifically, the shutdown protocol performs a shutdown in cooperation with a peer controller such that a shutdown act will not be taken until it is verified that the shutdown will not leave any resources unowned. The shown shutdown protocol commences by reading the heartbeat (at step 451). At decision 453, a test is made to determine if a heartbeat had been missed. If so, processing passes again through the graceful shutdown loop. If the heartbeat had not been missed, then the graceful shutdown sequence continues to the "No" path of decision 453, at which point (at decision 455), if the shutdown is deemed to have been a requested shutdown (see "Yes" path of decision 455), such as due to an administrative action, then the controller stops. Otherwise, the executing controller has to be certain that a shutdown due to a peer's failure is orderly. To accomplish a graceful shutdown, a pause 458 (e.g., a for a hardware timer timeout period) is executed, and loop 459 is entered.

It is possible that during a graceful shutdown sequence it is determined that the peer controller has ownership of the executing controller's resources. Accordingly, before shutdown is actually effected, the executing controller requests. During one or another pass through loop 459, the shutdown sequence is confirmed for both the executing controller and its peer, and the shutdown acts of the executing controller bring the controller to a stop.

Figure 5:
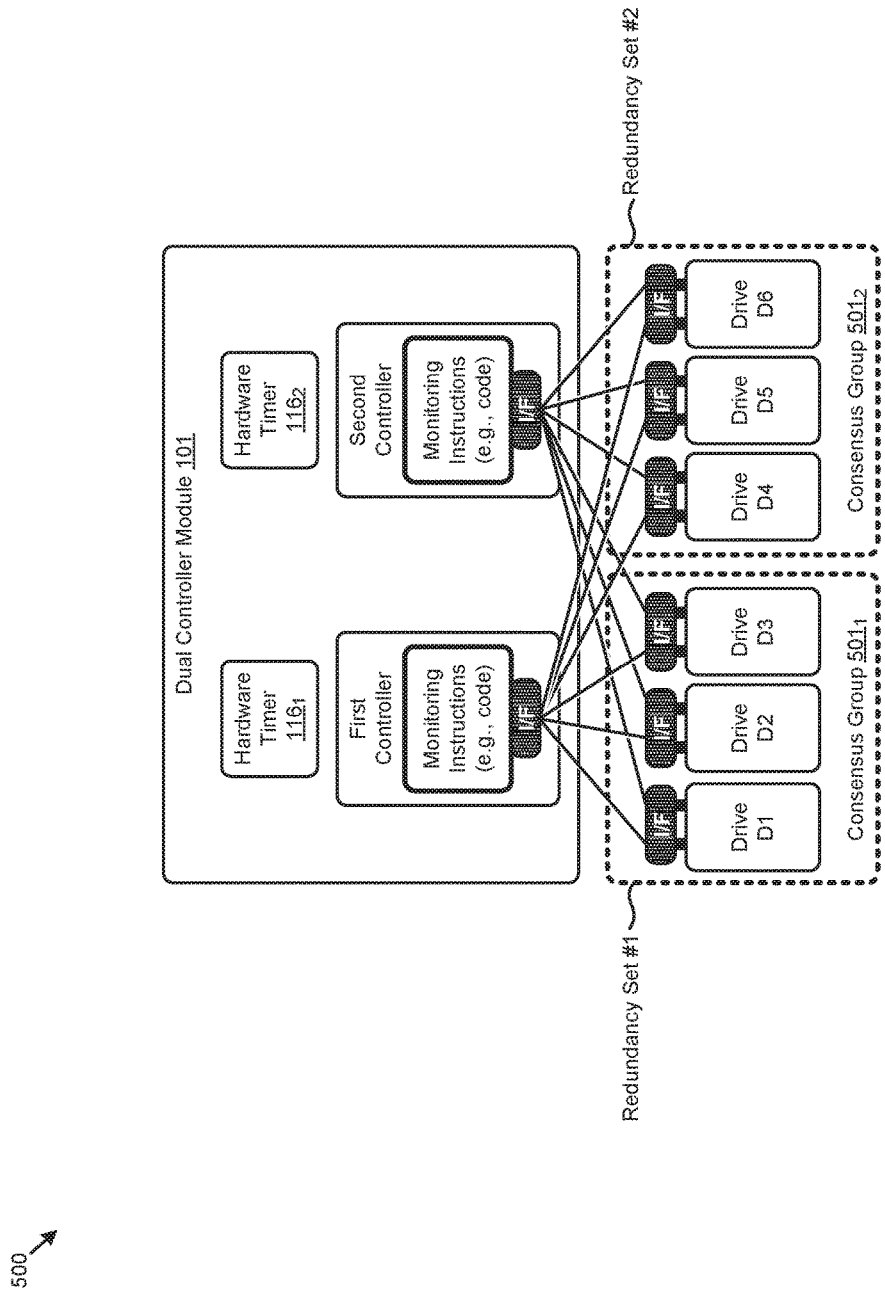
FIG. 5 is a diagram depicting assignment of disks to redundancy groups as carried out by a vendor-independent component of a high-availability storage array, according to an embodiment.

FIG. 5 is a diagram 500 depicting assignment of disks to redundancy groups as carried out by a vendor-independent component of a high-availability storage array. As an option, one or more variations of the shown assignment of disks to redundancy groups or any aspect thereof may be implemented in the context of the architecture and functionality of the embodiments described herein. The disclosed techniques for assignment of disks to redundancy groups may be implemented in any environment.

In configuring a high-availability storage array, multiple drives might be grouped together into a logical grouping to form a redundancy set. As shown in FIG. 5, there are two redundancy sets formed from six disks. The number of disks in a set is derived from system resiliency requirements. For example, assigning three disks to a redundancy provides support for one drive to fail without losing any data. As another example, assigning five disks to a redundancy set provides support for two drives to fail without losing any data. As used herein, the specific grouping of disks into sets is termed a disk inventory. A disk inventory identifies the members of a redundancy set. A disk inventory can be stored in any storage area accessible to the controllers.

A redundancy set, or a number of redundancy sets, can include a definition of one or more consensus groups. As depicted in FIG. 5, a first consensus group $501_1$ comprises disk D1, disk D2, and disk D3. A second consensus group $501_2$ comprises disk D4, disk D5, and disk D6. Storage I/Os (e.g., READs and WRITEs, etc.) are sent in parallel to all disks of a consensus group. In the event that a discrepancy is found between responses from the drives in the consensus group, the responses of a voting majority are deemed to be the correct responses. The deemed correct responses are returned to the caller. The drive or drives that introduce the discrepancy are marked for remediation.

Any known techniques can be used to implement write consensus logic for failsafe WRITE I/O processing and/or to implement consensus logic for failsafe READ I/O processing.

Additional Embodiments of the Disclosure

System Architecture Examples

Figure 6:
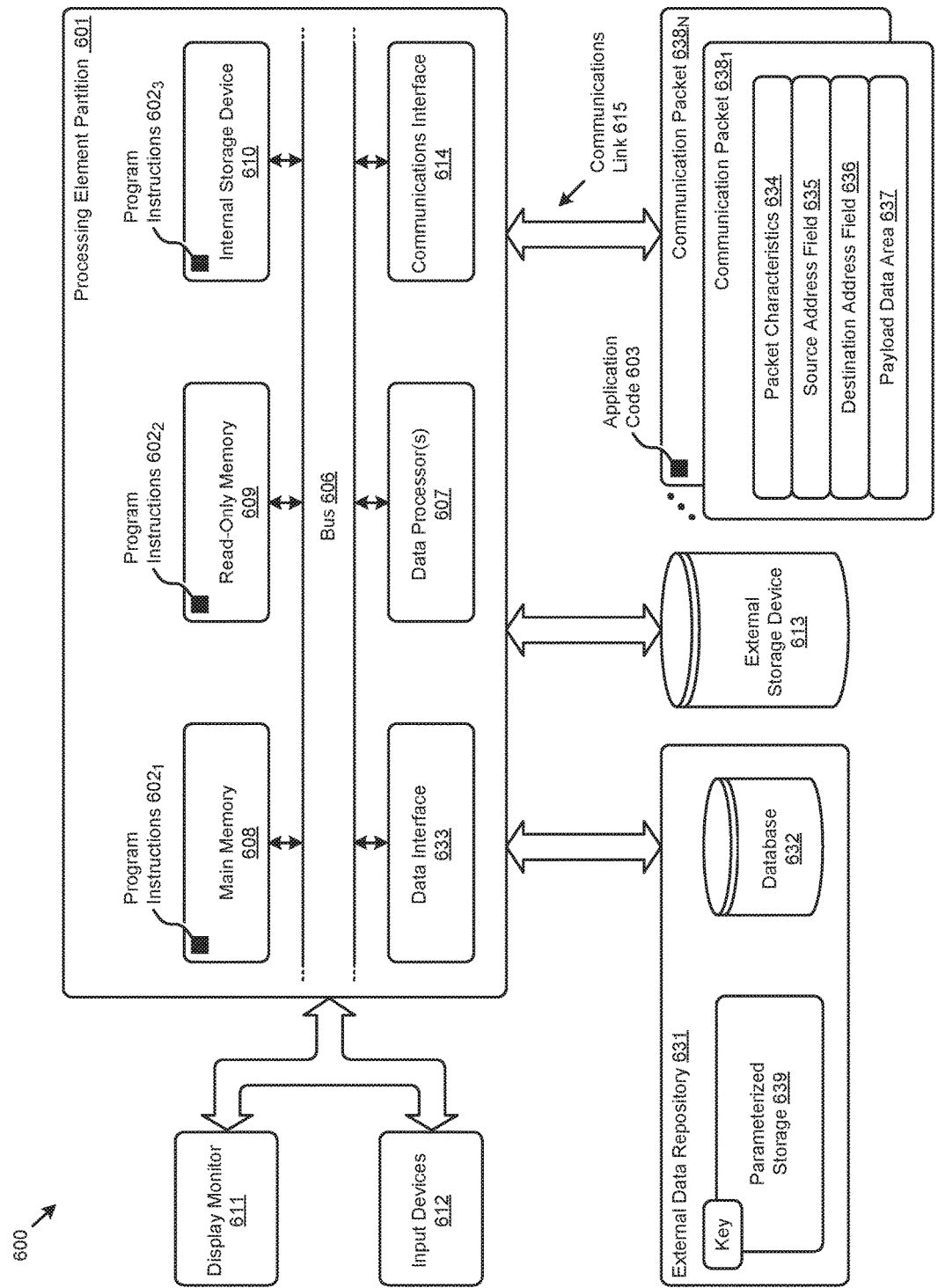
FIG. 6 depicts a block diagram of an instance of a computer system 600 suitable for implementing embodiments of the present disclosure.

FIG. 6 depicts a block diagram of an instance of a computer system 600 suitable for implementing embodiments of the present disclosure. Computer system 600 includes a bus 606 or other communication mechanism for communicating information. The bus interconnects subsystems and devices such as a CPU, or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. The shown computer system 600 further comprises a display 611 (e.g., CRT or LCD), various input devices 612 (e.g., keyboard, cursor control), and an external data repository 631.

According to an embodiment of the disclosure, computer system 600 performs specific operations by data processor 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 600 performs specific networking operations using one or more instances of communications interface 614. Instances of the communications interface 614 may comprise one or more networking ports that are configurable (e.g., pertaining to speed, protocol, physical layer characteristics, media access characteristics, etc.) and any particular instance of the communications interface 614 or port thereto can be configured differently from any other particular instance. Portions of a communication protocol can be carried out in whole or in part by any instance of the communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

The communications link 615 can be configured to transmit (e.g., send, receive, signal, etc.) any types of communications packets (e.g., communications packet $638_1$, communications packet $638_N$) comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of the computer system 600. According to certain embodiments of the disclosure, two or more instances of computer system 600 coupled by a communications link 615 (e.g., LAN, PTSN, or wireless network) may perform the sequence of instructions required to practice embodiments of the disclosure using two or more instances of components of computer system 600.

The computer system 600 may transmit and receive messages such as data and/or instructions organized into a data structure (e.g., communications packets). The data structure can include program instructions (e.g., application code 603), communicated through communications link 615 and communications interface 614. Received program code may be executed by data processor 607 as it is received and/or stored in the shown storage device or in or upon any other non-volatile storage for later execution. Computer system 600 may communicate through a data interface 633 to a database 632 on an external data repository 631. Data items in a database can be accessed using a primary key (e.g., a relational database primary key).

The processing element partition 601 is merely one sample partition. Other partitions can include multiple data processors, and/or multiple communications interfaces, and/ or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to implementing vendor-independent intent signaling records in a lockless protocol. A module may include one or more state machines and/or combinational logic used to implement vendor-independent intent signaling records in a lockless protocol.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement vendor-independent intent signaling records in a lockless protocol). Such files or records can be brought into and/or stored in volatile or non-volatile memory.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A system comprising:
a first controller having a first timer and a first drive interface;
a second controller having a second timer and second drive interface; and
a set of dual channel drives electrically coupled to both the first drive interface and the second drive interface, wherein the first controller writes a controller status to a status area on one or more of the set of dual channels drives based on at least the first timer, and the second controller reads the status area based on at least the second timer to determine if the first controller reported operational status during a first time period of the first timer corresponding to a second time period of the second timer.

2. The system of claim 1, wherein the first timer and the second timer are separate hardware timers.

3. The system of claim 1, wherein the first controller and the second controller correspond to separate hardware.

4. The system of claim 1, wherein the first drive interface comprises at least a first plurality of physical hardware interface connections and the second drive interface comprises at least a second plurality of physical hardware interface connections.

5. The system of claim 1, wherein the first controller is a sole owner of the set of dual channel drives.

6. The system of claim 1, wherein the set of dual channel drives comprise two physical connections for connection to respective drive interfaces.

7. The system of claim 6, wherein at least some of the set of dual channel drives are initially assigned to a first redundancy group.

8. The system of claim 6, wherein the first controller writes controller status information to two or more of the set of dual channel drives.

9. The system of claim 6, wherein the second controller reads controller status information from two or more of the set of dual channel drives to implement a consensus scheme.

10. The system of claim 1, wherein the second controller resets the second timer in response to determining that the first controller reported operational status during a corresponding time period.

11. The system of claim 1, wherein the first controller issues an instruction to pause the second timer for timeout period.

12. The system of claim 1, wherein the second controller signals an intention to take ownership of the set of dual channel drives in response to failing to determine that the first controller provided controller status information reporting an operational status.

13. The system of claim 1, wherein the status area on the one or more of the set of dual channels drives are separate from user data areas.

14. A method comprising:
writing a controller state to a status area on one or more of a set of dual channel drives based on at least a first timer by a first controller having a first drive interface electrically coupled to the set of dual channel drives;
reading a controller state from the status area on one or more of the set of dual channel drives based on at least a second timer by a second controller having a second drive interface electrically coupled to the set of dual channel drives; and
determining if the first controller reported operational status during a first time period of the first timer corresponding to a second time period of the second timer.

15. The method of claim 14, wherein the first timer and the second timer are separate hardware timers.

16. The method of claim 14, wherein the first controller and the second controller correspond to separate hardware.

17. The method of claim 14, wherein the first drive interface comprises at least a first plurality of physical hardware interface connections and the second drive interface comprises at least a second plurality of physical hardware interface connections.

18. The method of claim 14, wherein the first controller is a sole owner of the set of dual channel drives.

19. A non-transitory computer readable medium having stored thereon a sequence of instructions which, when executed by a processor performs a set of acts comprising:
writing a controller state to a status area on one or more of a set of dual channel drives based on at least a first timer by a first controller having a first drive interface electrically coupled to the set of dual channel drives;
reading a controller state from the status area on one or more of the set of dual channel drives based on at least a second timer by a second controller having a second drive interface electrically coupled to the set of dual channel drives; and
determining if the first controller reported operational status during a first time period of the first timer corresponding to a second time period of the second timer.

20. The computer readable medium of claim 19, wherein the first timer and the second timer are separate hardware timers.

* * * * *